US006993058B2

(12) United States Patent
Zhu

(10) Patent No.: US 6,993,058 B2
(45) Date of Patent: Jan. 31, 2006

(54) COHERENT POPULATION TRAPPING DETECTOR

(75) Inventor: Miao Zhu, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 289 days.

(21) Appl. No.: 10/425,138

(22) Filed: Apr. 28, 2003

(65) Prior Publication Data

US 2004/0223523 A1 Nov. 11, 2004

(51) Int. Cl.
*H01S 3/08* (2006.01)

(52) U.S. Cl. ............................ 372/106; 372/32; 331/3; 331/94.1

(58) Field of Classification Search .................. 372/32, 372/26, 31, 98, 106; 331/3, 94.1
See application file for complete search history.

(56) References Cited

U.S. PATENT DOCUMENTS

| | | | | |
|---|---|---|---|---|
| 6,201,821 | B1 | 3/2001 | Zhu et al. | 372/32 |
| 6,222,424 | B1 * | 4/2001 | Janssen et al. | 331/94.1 |
| 6,255,647 | B1 * | 7/2001 | Vanier et al. | 250/251 |
| 6,265,945 | B1 * | 7/2001 | Delaney et al. | 331/3 |
| 6,320,472 | B1 * | 11/2001 | Vanier | 331/94.1 |
| 6,359,916 | B1 * | 3/2002 | Zhu | 372/32 |
| 6,359,917 | B1 * | 3/2002 | Cutler et al. | 372/32 |
| 6,363,091 | B1 | 3/2002 | Zhu et al. | 372/32 |
| 6,806,784 | B2 * | 10/2004 | Hollberg et al. | 331/94.1 |
| 6,831,522 | B2 * | 12/2004 | Kitching et al. | 331/3 |
| 6,888,780 | B2 * | 5/2005 | Happer et al. | 368/10 |

OTHER PUBLICATIONS

All-Optical Microwave Frequency Standard: A Proposal—Cyr, et al IEEE, vol. 42, No. 2, Apr. 1993, p. 640-649.

Novikova, I. et al., "AcStark Shifts in the Nonlinear Faraday Effect", Opticas Letters, vol. 25, No. 22, Nov. 15, 2000, pp. 1651-1653.

Liu Z. D. et al., "Raman Polarization-Selective Feedback Schemes for All-Optical Microwave Frequency Standards", Applied Physics Letters, vol. 39, No. 16, Oct. 14, 1996, pp. 2318-2320.

Zhu, Miao, "High Contrast Signal in a Coherent Population Trapping Based Atomic Frequency Standard Applicatin", IEEE Intl. Frequency Control Symposium, May 4, 2003, pp. 16-21.

* cited by examiner

*Primary Examiner*—Minsun Oh Harvey
*Assistant Examiner*—James Menefee

(57) ABSTRACT

A CPT detector and a method for detecting CPT are disclosed. The CPT detector includes a quantum absorber, a polarization analyzer, and a detector. The quantum absorber includes a material having first and second low energy states coupled to a common high energy state. Transitions between the first low energy state and the common high energy state and between the second low energy state and the common high energy state are induced by electromagnetic radiation having a predetermined polarization state. The polarization analyzer blocks electromagnetic radiation of the predetermined polarization while passing electromagnetic radiation having a polarization state that is orthogonal to the predetermined polarization. The polarization analyzer is irradiated with a portion of the generated electromagnetic radiation that has passed through the quantum absorber. The detector generates a signal related to the intensity of electromagnetic radiation that leaves the polarization analyzer.

18 Claims, 5 Drawing Sheets

MODULATED LASER
λ/4
ABSORPTION CELL
λ/4
LINEAR POLARIZATION ANALYZER
PHOTO-DETECTOR
CONTROLLER
MICROWAVE SOURCE
OUTPUT
30
31
32
33
34
40
80
90
91
92
93
94
95
101
102
104
22
23
24
27
28
29
83
84

COHERENT POPULATION TRAPPING DETECTOR

FIELD OF THE INVENTION

The present invention relates to devices that utilize coherent population trapping to determine the resonance frequency associated with two energy levels in a quantum absorber.

BACKGROUND OF THE INVENTION

To simplify the following discussion, the present invention will first be explained in terms of a frequency standard. Other applications of the invention will then be discussed below. High-speed communication links that operate at modulation frequencies above 1 GHz have become common in telecommunications and other digital communication links. Such systems have created a need for inexpensive frequency standards that can operate outside the standards laboratory. Such a frequency standard must provide a reliable output signal independent of environmental fluctuations such as temperature and magnetic fields.

One class of frequency standard that has the potential for meeting these needs utilizes Coherent-Population-Trapping (CPT) in quantum absorbers. CPT-based frequency standards are described in U.S. Pat. Nos. 6,363,091 and 6,201,821, which are hereby incorporated by reference. Since such frequency standards are known to the art, they will not be described in detail here. For the purposes of the present discussion, it is sufficient to note that in such standards, the output of an electromagnetic source that has two frequency components (CPT-generating frequency components) that are separated by a frequency difference is applied to a quantum absorber. The quantum absorber has at least two low energy states and at least one high energy state that can be reached by transitions from each of the low energy states. One of these two CPT-generating frequency components in the applied electromagnetic field induces transition from one of the low energy states to the high energy state while the other frequency component induces the transition from the other low energy state to the common high energy state. Thus the quantum absorber absorbs the energy from the applied electromagnetic field.

When the frequency difference between the two frequency components is approximately the same as the corresponding frequency difference between two low energy states in the quantum absorber, the quantum absorber can be in a linear superposition of the two low energy states such that the quantum absorber does not interact with the applied electromagnetic field. This phenomenon is called Coherent-Population-Trapping (CPT). The quantum absorber exhibits an absorption minimum (or a transmission maximum) when the frequency difference between the two frequency components is exactly the same as the corresponding frequency difference between two low energy states in the quantum absorber. A suitable detector measures the intensity of the electromagnetic field transmitted through the quantum absorber. A servo loop can be used to adjust the frequency difference of these two frequency components such that the maximum amount of electromagnetic field leaves the quantum absorber. Hence, the frequency difference of these two frequency components is held at a precise value that is related to the difference in energy of the corresponding low energy states of the quantum absorber. If the difference in energy of the low states in the absorber remains constant, the resultant frequency standard will have a very high precision.

In some frequency standards, a modulated laser is used to produce the CPT-generating frequency components. One or more sidebands from the modulation can be used as the CPT-generating frequency components. In this case, the servo-loop mentioned above controls the frequency difference between the CPT-generating frequency components by adjusting the modulation frequency. Since the modulation frequency generator is held at a frequency determined by the low states of the absorber, the output of the modulation frequency generator provides a frequency standard having high precision provided the difference in energy of the corresponding low energy states of the quantum absorber remains constant.

As noted above, to be useful as a CPT-based frequency standard, the device must be insensitive to environmental conditions. Since the CPT is induced by the applied electromagnetic field at the frequencies corresponding to the transition frequencies from the low energy states to the common high energy state, the absorber often exhibits an AC Stark shift. As a result, the energy difference between the two low energy states will vary as a function of the intensity of the CPT-generating frequency components applied to the quantum absorber.

One method for reducing the AC Stark shift operates by introducing additional frequency components (AC-Stark-shift-manipulating frequency components) into the applied electromagnetic field. If the AC-Stark-shift-manipulating frequency components have the correct intensities and frequencies relative to the intensities of the CPT-generating frequency components discussed above, the AC Stark shift is substantially reduced. In this case, the difference in energy between the two low states will be insensitive to the intensities of the CPT-generating frequency components. If a modulated laser is used to generate the CPT-generating frequency components, the intensities of the AC-Stark-shift-manipulating frequency components are readily changed by adjusting the amplitude of the modulation signal applied to the laser. The frequencies of the AC-Stark-shift-manipulating frequency components are determined by the modulation frequency. In this example, both the CPT-generating frequency components and the AC-Stark-shift-manipulating frequency components are generated by modulating the same laser; the ratio of intensity of any one frequency component to any other frequency component is determined by the modulation. Therefore the AC Stark shift is insensitive to the total incidence intensity of the laser beam.

While the inclusion of the AC-Stark-shift-manipulating frequency components substantially corrects the problems introduced by the AC Stark shift, the AC-Stark-shift-manipulating frequency components reduce the signal-to-noise ratio in the output of the detector used to measure the intensity of electromagnetic radiation transmitted through the quantum absorber. Hence, these components reduce the effectiveness of the servo loop that corrects for variations in the frequency difference between the CPT-generating frequency components. The reduction in signal-to-noise ratio results from a difference in absorption between the CPT-generating frequency components and the AC-Stark-shift-manipulating frequency components. The AC-Stark-shift-manipulating frequency components suffer much less absorption in the quantum absorber than the two CPT-generating frequency components. Since the detector measures the sum of the powers of each of the frequency components in the electromagnetic field transmitted through the quantum absorber, the power in these AC-Stark-shift-manipulating frequency components forms a more or less constant background signal that is superimposed on the signal represented by the variation in the intensities of the two CPT-generating frequency components as the frequency difference between them is varied. This background signal reduces the signal-to-noise ratio.

SUMMARY OF THE INVENTION

The present invention includes a CPT detector having a quantum absorber, polarization analyzer and detector. The quantum absorber includes a material having first and second low energy states coupled to a common high energy state. Transitions between the first low energy state and the common high energy state and between the second low energy state and the common high energy state are induced by electromagnetic radiation having a first polarization. The first polarization is altered to a second polarization when the electromagnetic radiation passes through the quantum absorber. The polarization analyzer preferentially blocks electromagnetic radiation having a polarization state different from the second polarization state. The polarization analyzer is irradiated with a portion of an electromagnetic signal that has passed through the quantum absorber. The detector generates a signal related to the intensity of electromagnetic radiation that leaves the polarization analyzer.

In one embodiment, the CPT detector also includes an electromagnetic radiation source that generates electromagnetic radiation having CPT-generating frequency components for generating CPT, and additional frequency components for reducing an AC Stark shift in the quantum absorber. The CPT-generating frequency components differ in frequency by 2ν. The CPT-generating frequency components have the first polarization state. The generated electromagnetic radiation irradiates the quantum absorber. A controller alters ν in response to the generated signal from the detector. A signal having a frequency determined by ν is also generated in embodiments in which the CPT detector is used as a frequency standard.

In another embodiment, the electromagnetic radiation source includes a first electromagnetic radiation generator that generates electromagnetic radiation at a frequency equal to $\nu_L$ and an oscillator for generating a modulation signal having a frequency ν. The modulating signal modulates the electromagnetic radiation from the first electromagnetic radiation source to generate a modulated electromagnetic radiation signal. The CPT generator may also include a polarization synthesizer for causing the modulated electromagnetic radiation signal to have the first polarization.

In yet another embodiment, the electromagnetic radiation source includes a laser for generating a first light signal having a third polarization state and a tunable oscillator for generating a signal that modulates the first light signal. A quarter waveplate for altering the third polarization state to the first polarization state may also be included.

DETAILED DESCRIPTION OF THE PREFERRED EMBODIMENTS OF THE INVENTION

Figure 1:
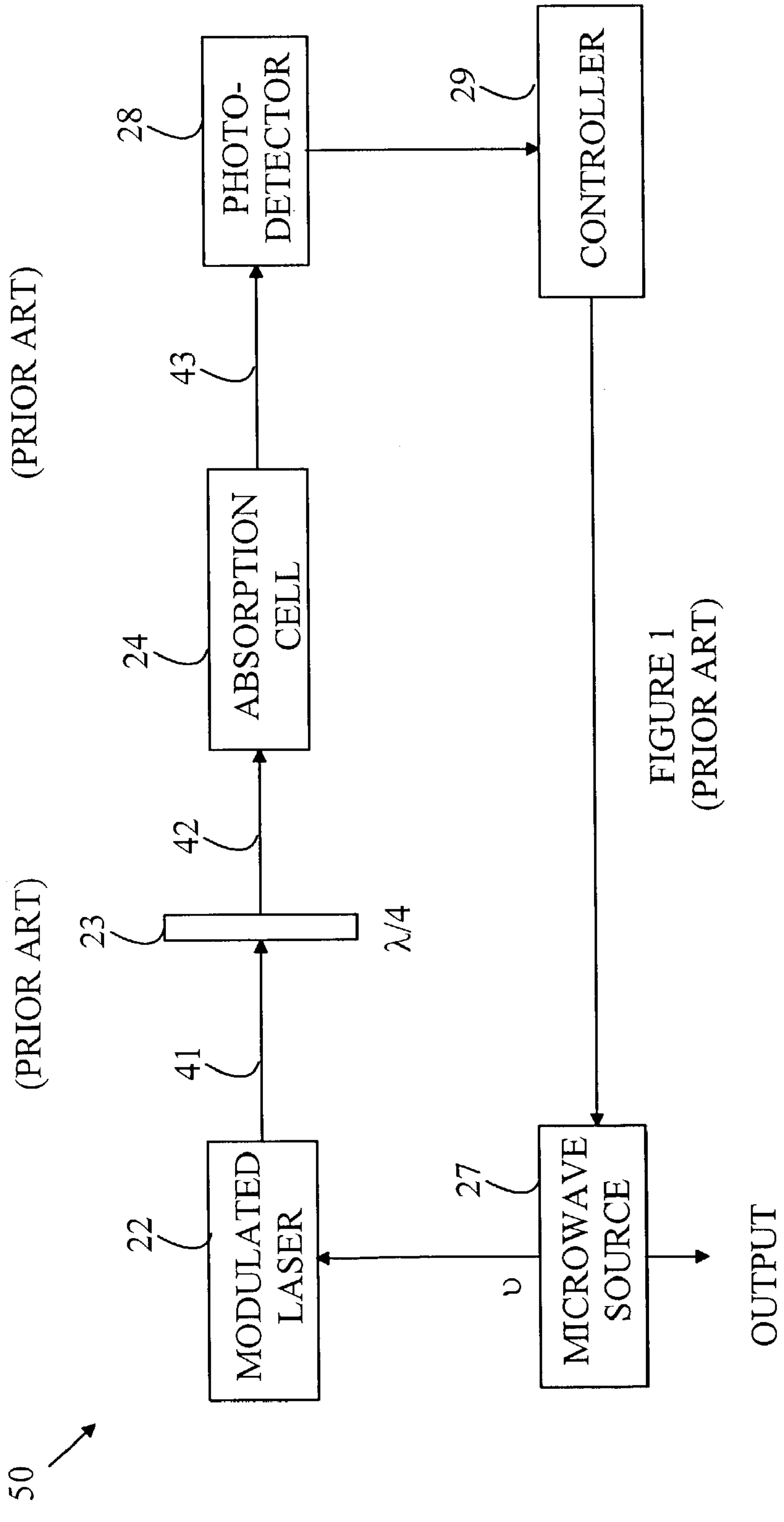
FIGURE 1 (PRIOR ART)
FIG. 1 is a block diagram of a prior art CPT based reference signal generator.

The manner in which the present invention provides its advantages can be more easily understood with reference to FIG. 1, which is a block diagram of a prior art CPT-based reference signal generator 50. Reference signal generator 50 utilizes a laser that is modulated at a frequency determined by a microwave source 27. The modulation frequency will be denoted by ν in the following discussion. Since laser modulation is well known in the art, the circuitry for modulating the laser has been included in a single block 22 representing the laser and the associated modulation circuitry.

Figure 2:
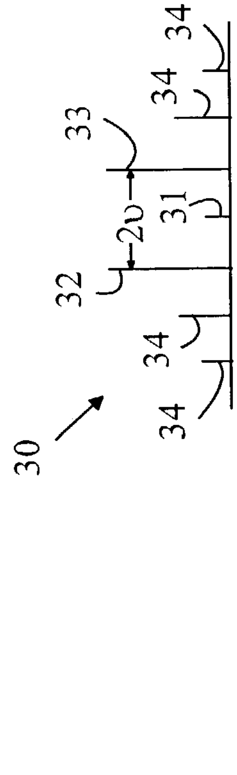
FIGURE 2 (PRIOR ART)
FIG. 2 illustrates the light spectrum generated by the modulated laser shown in FIG. 1.

The optical spectrum generated by the modulated laser is shown at 30 in FIG. 2. The spectrum has a number of frequency components. Line 31 represents the unmodulated output of the laser (carrier). Lines 32 and 33 are, respectively, the minus first order sideband and the plus first order sideband generated by the modulation of the laser carrier frequency 31 with a modulation frequency ν. The plus and minus first order sidebands are the CPT-generating frequency components. The frequency components shown at 34 are the higher order sidebands that are utilized to reduce the AC Stark shift discussed above.

In this example, it will be assumed that the output of the laser is linearly polarized, and that the light entering absorption cell 24 at 42 must be circularly polarized to excite the relevant CPT transitions in the quantum absorber utilized in the absorption cell. Hence, the output of the laser is passed through a quarter waveplate 23 prior to being applied to absorption cell 24.

Absorption cell 24 contains a quantum absorber having two ground states that are separated by an energy difference corresponding to a frequency difference of W. Each of the ground states is connected to a common excited state by an appropriate frequency component. As will be explained in more detail below, transitions from one of the ground states to the common excited state are induced by photons in frequency component 32, and transitions from the other of the ground states to the common excited state are induced by photons in frequency component 33. In a quantum absorber, the absorption cell has a minimum in its absorption when the frequency difference of the CPT-generating frequency components 32 and 33, i.e., 2ν, is equal to W, provided both CPT-generating frequency components are present. Hence, by adjusting the microwave frequency, ν, to maximize the light transmitted through absorption cell 24, microwave source 27 will be precisely locked at a frequency of W/2.

Figure 3:
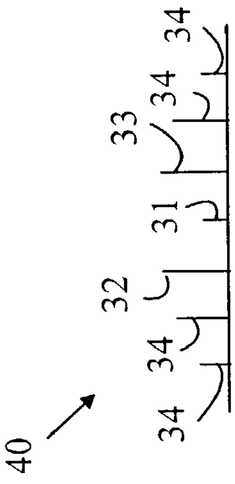
FIGURE 3 (PRIOR ART)
FIG. 3 illustrates the spectrum of the light transmitted through absorption cell 24 shown in FIG. 1.

The spectrum of the light transmitted through the absorption cell 24 is shown at 40 in FIG. 3. To simplify the discussion, the frequency components have been given the same numerical designations as in spectrum 30. While the absorption of the CPT-generating frequency components 32 and 33 is minimized when 2ν is equal to W, absorption cell 24 still absorbs a significant amount of light from these frequency components. In contrast, the light in the sidebands shown at 34 and the laser carrier 31 is not significantly absorbed by the quantum absorber because the energies of these frequency components do not correspond to any transitions in the quantum absorber. Hence, the powers of the CPT-generating frequency components 32 and 33 in the light signal entering photodetector 28 are substantially reduced relative to their powers in spectrum 30. Thus the CPT signal has a lower contrast. Since the total optical power incident on the photodetector 28 determines the measured noise, the resultant signal-to-noise ratio decreases. This low signal-to-noise ratio reduces the accuracy with which controller 29 can servo microwave source 27 to maintain the frequency of microwave source at W/2. The present invention overcomes this problem by increasing the relative intensities of lines 32 and 33 relative to lines 31 and 34 in the light entering the photodetector.

Figure 4:
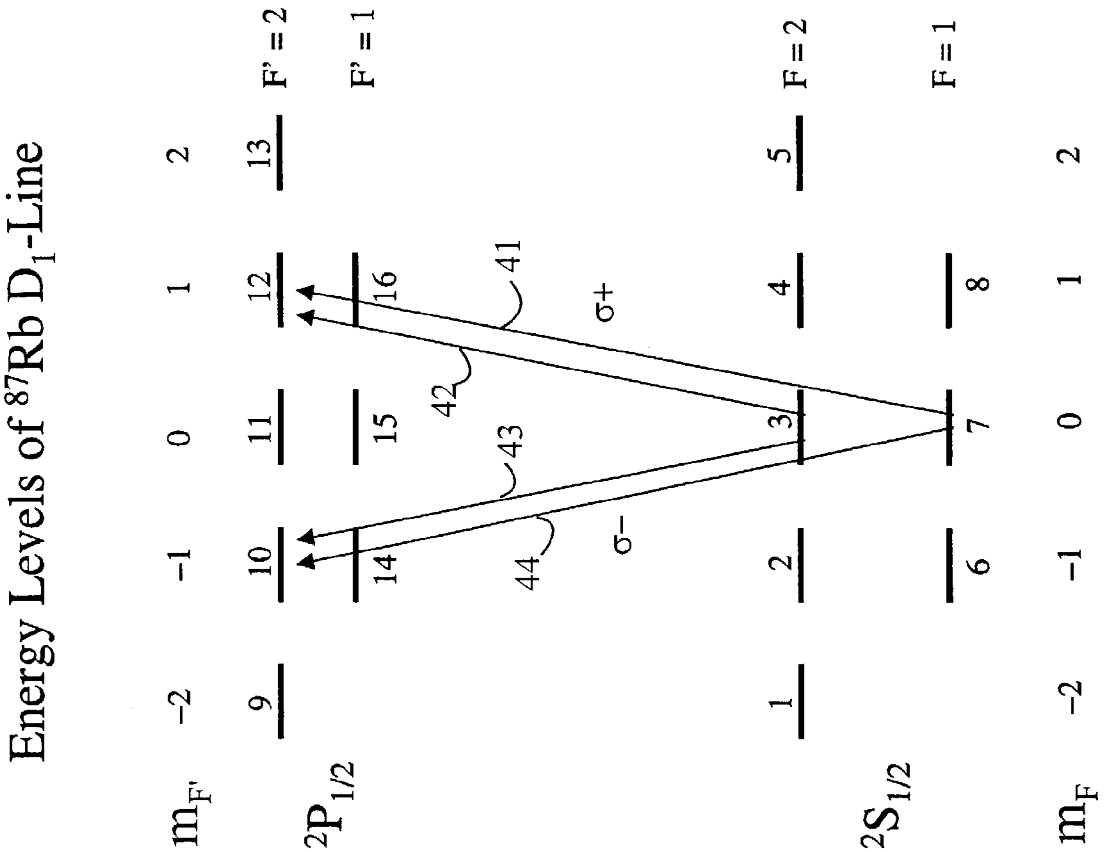
FIG. 4 illustrates some of the energy levels associated with an exemplary quantum absorber material, $^{87}$Rb.

Refer now to FIG. 4, which illustrates some of the energy levels associated with an exemplary quantum absorber material, the $^{87}Rb$ atom. FIG. 4 is an energy level diagram for the states associated with the $D_1$ line of the $^{87}Rb$ atom. The CPT effect is found in quantum absorbers having two low energy states that are coupled to a common high energy state. In this case, the two ground states shown at 3 and 7, which serve as the two low energy states, are separated by an energy corresponding to a frequency of 6.8 GHz. Hence, a reference signal generator based on the ground states of $^{87}Rb$ can provide a standard frequency signal at 3.4 GHz. Using frequency synthesis, which is known to the art, any user-specified frequency can also be generated.

To simplify the following discussion, we assume that the applied electromagnetic field is tuned to induce the transitions to the excited states F'=2. The effect of the F'=1 energy states, i.e., the states 14, 15, and 16 can be ignored in the following discussion. The $D_1$ energy levels of $^{87}Rb$ exhibit two sets of transitions that can be utilized to generate CPT. The transitions shown at 41 and 42 couple the ground states shown at 7 and 3 to an excited state shown at 12. These transitions are excited by the light with right-handed circular polarization. A similar pair of transitions shown at 43 and 44 couple ground states shown at 3 and 7 to a second common state shown at 10. Transitions 43 and 44 are excited by the light with left-handed circular polarization. The right-handed circular polarization is orthogonal to the left-handed circular polarization. For the purposes of the present discussion, the energy differences between the various states will be written in terms of the corresponding of frequencies of electromagnetic radiation that induces transitions between these levels. The energy difference between states 3 and 7 is equal to hW, where h is the Planck constant. The energy difference between states 3 and 12 and states 3 and 10 can be written as $h(\nu_0-W/2)$, where $h\nu_0$ is the average of the energy difference between the state 12 and state 3 and the energy difference between the state 12 and state 7. Similarly, the energy difference between states 7 and 12 and states 7 and 10 can be written as $h(\nu_0+W/2)$. To enhance CPT, the laser carrier frequency, $\nu_L$, must be approximately equal to $\nu_0$. Methods for controlling the laser carrier to keep $\nu_L \approx \nu_0$ are known to the art, and hence, will not be discussed here.

If $^{87}Rb$ is illuminated with light having energy at both $(\nu_0-W/2)$ and $(\nu_0+W/2)$ the transmission of this light through the material is greater than the case in which light of either frequency alone is utilized. Hence, if the laser shown in FIG. 1 outputs light at a frequency of $\nu_L \approx \nu_0$ and the microwave source is tuned to a frequency of $\nu=W/2$, either the transitions at 41 and 42 or the transitions at 44 and 43 will be used to generate CPT, depending on the polarization state of the light.

The present invention is based on the observation that CPT exhibits dichroism (absorption dependence on the polarization states) and birefringence (refractive index dependence on the polarization states), especially for the frequency components in resonance with the transitions associated with the energy states related to the CPT. Thus the polarization states of the CPT-generating frequency components are altered when those frequency components pass through the quantum absorber while the polarization states for the AC-Stark-shift manipulating frequency components are not altered substantially if these frequency components are de-tuned from the transition frequencies in the quantum absorber. In the example discussed above with reference to FIGS. 1–4, the change of the polarization states of the frequency components $(\nu_L-\nu)$ and $(\nu_L+\nu)$ has a stronger dependence on the microwave detuning $2\nu-W$ than the change in the polarization states of the frequency components $\nu_L$ and $(\nu_L \pm m\nu)$, where m>1.

Figures 5, 6, 7, 8, 9, 10, 11, 12, 13:
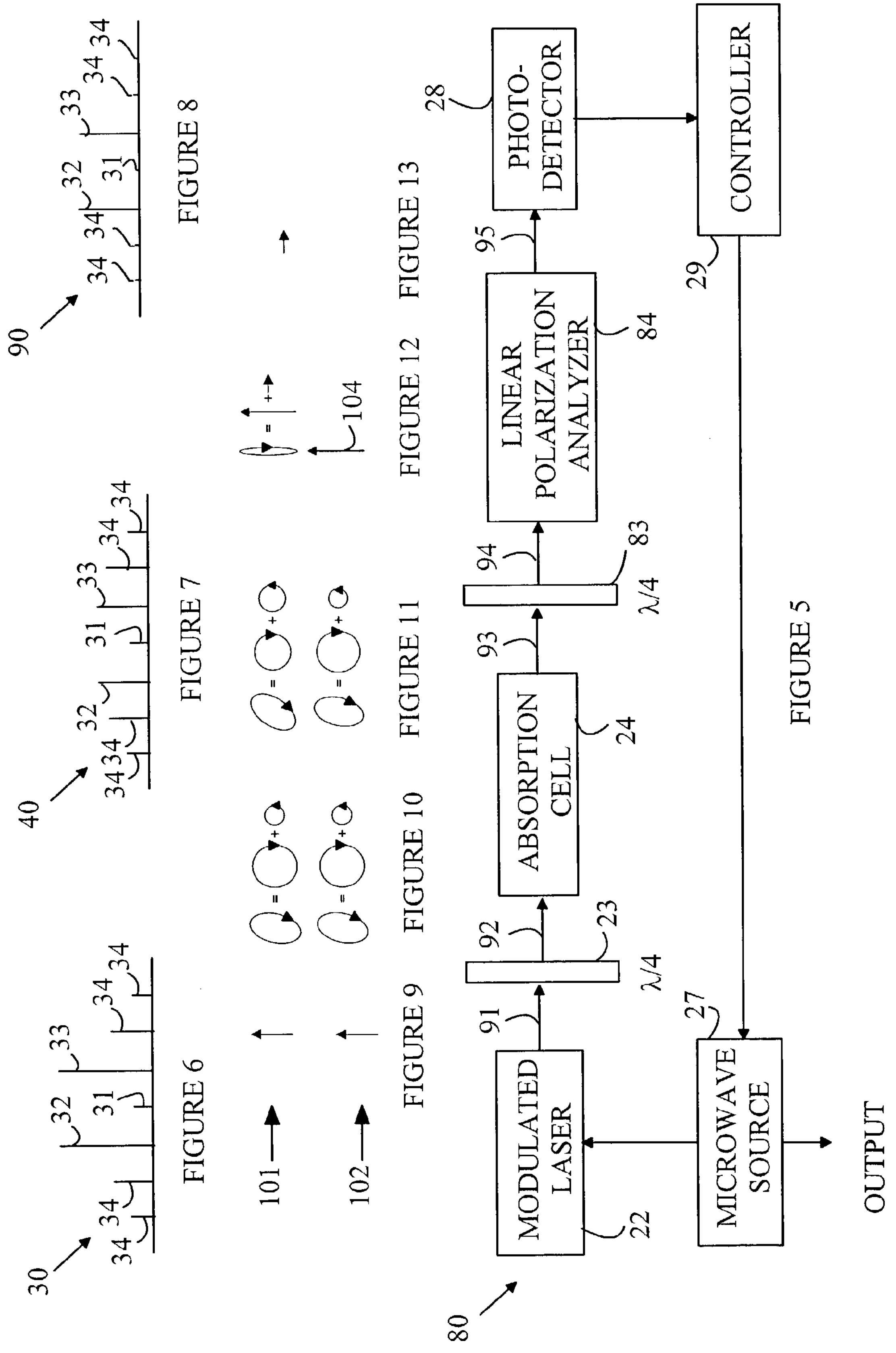
FIG. 5 is a block diagram of a reference signal generator 80 according to one embodiment of the present invention.
FIGS. 6–8 illustrate the light spectrum at selective locations in reference signal generator 80.
FIGS. 9–13 illustrate the polarization states of the light in two groups of frequency components at selected locations in reference to signal generator 80.

The manner in which the present invention provides its advantages will now be explained in more detail utilizing FIGS. 5–13. FIG. 5 is a block diagram of a reference signal generator 80 according to one embodiment of the present invention. In this embodiment, it will be assumed that the CPT transitions in the quantum absorber are induced by right-handed circularly polarized light. FIGS. 6–8 illustrate the light spectrum at selective locations in reference signal generator 80.

FIGS. 9–13 illustrate the polarization states of the light in two groups of frequency components at selected locations in reference signal generator 80. The first group is the CPT-generating frequency components consisting of frequency components 32 and 33 discussed above. The second group is the AC-Stark-shift manipulating frequency components consisting of frequency components 31 and 34 discussed above. The polarization symbols shown at 101 represent the polarization states associated with the first group of frequency components, and the polarization symbols shown at 102 represent the polarization states associated with the second group of frequency components.

Refer now to FIG. 5. To simplify the following discussion, those elements of reference signal generator 80 that serve functions that are analogous to elements discussed above with reference to FIG. 1 have been given the same numeric designations and will not be discussed in detail here. Laser 80 includes a second waveplate 83 and a linear polarization analyzer 84 that are inserted between the quantum absorber cell 24 and the photodetector 28.

The output of modulated laser 22 is linearly polarized as shown in FIG. 9. Both groups of frequency components have the same polarization when leaving modulated laser 22. The energy spectrum at locations 91 and 92 is shown in FIG. 6. The light from modulated laser 22 is applied to quarter waveplate 23, which converts the linearly polarized light to elliptically polarized light as shown at FIG. 10. This elliptically polarized light can be decomposed into right-handed-circularly polarized light, $\sigma^+$, and the left-handed-circularly polarized light, $\sigma^-$. In this particular embodiment, most of the power is in the right-handed-circularly polarization state, $\sigma^+$, for CPT generation. This elliptically polarized light is applied to absorption cell 24.

Upon passing through absorption cell 24, both the energy spectrum and polarization of the light will have changed. The energy spectrum at locations 93 and 94 is shown in FIG. 7. The polarization of the first group of frequency components, i.e., frequencies 32 and 33 has now been altered. Both the ratio of the power in $\sigma^+$-polarization to the power in $\sigma^-$-polarization and the relative phase between the $\sigma^+$-polarization and the $\sigma^-$-polarization are changed by the induced CPT. In addition, the power in these frequency components has decreased. In contrast, the polarization of the light in the second group of frequency components has not been altered substantially, i.e., the light in these frequency components has essentially remained in the same elliptical polarization state as the light in these frequency components was prior to entering the absorption cell 24. In addition, the intensity of the light in the second group of frequency components has not substantially decreased.

The light transmitted through absorption cell 24 is applied to a second quarter waveplate 83 that converts the polarization of the light such that the light in the AC Stark manipulating components can be preferentially separated form the light in the CPT-generating frequency components by linear polarization analyzer 84. The axis of waveplate 83 is set such that upon leaving the quarter waveplate 83 the first group of frequency components is, in general, elliptically polarized while the second group of frequency components is linearly polarized. The azimuth and ellipticity of the polarization state, as well as the intensity of the first group of frequency components depend on the detuning $2\nu-W$. The elliptical polarization state for the first group of frequency components can be decomposed into two orthogonal linear polarizations with an appropriate relative phase as shown in FIG. 12. These two linear polarizations can be chosen such that one of them is parallel to the linear polarization of the second group of frequencycomponents. To simplify the discussion, it will be assumed that the axis of quarter waveplate 83 is set such that the light in the second group of wavelengths is converted to linear polarized light having the same direction of polarization as the light leaving modulated laser 22. The polarization states of the two groups of frequency components upon leaving quarter waveplate 83 are shown in FIG. 12.

The light leaving quarter waveplate 83 is applied to a linear polarization analyzer 84 that blocks light having a polarization in the direction of the second group of frequency components at point 94. This filter blocks the light in the second group of frequency components and the portion of the light in the first group of frequency components that is parallel to that direction, i.e., component 104 shown in FIG. 12. As a result, the only light reaching photodetector 28 is the light having the polarization shown in FIG. 13 which ideally consists only of light from the first group of frequency components. The optical power reaching photodetector depends on the CPT generation conditions, especially on the detuning $2\nu-W$.

The spectrum of the light entering photodetector 28 at 95 is shown in FIG. 8. Since practical quarter waveplates and polarization analyzers are not perfect, a small signal at the frequencies of the second group of frequency components is shown in FIG. 8. In addition, the polarization state for the second group of frequency components can be changed slightly by the imperfect cell windows as well as the detuned transitions in the quantum absorber. This kind of polarization state change can be, at least partially, compensated by the modification of the second waveplate 83. It should be noted that the vertical scale in spectrum 90 has been expanded so that the relative intensities of the two groups of frequency components can be seen.

The above-described embodiments of the present invention assume that the CPT in the quantum absorber is induced by circularly polarized light and that the quantum absorber exhibits birefringence with respect to the circular polarization states. That is, the quantum absorber introduces a phase shift into light of one circular polarization relative to the other circular polarization. In addition, the quantum absorber exhibits dichroism with respect to the circular polarization states. That is, the absorption of one circular polarization is different from the other circular polarization. However, not all CPT transitions are induced by circularly polarized light. Some materials, for example, have CPT transitions that are excited by elliptically polarized light. In such cases, the polarization of laser light must be converted to the desired polarization. Upon passing through the quantum absorber, some of the light having a polarization that is the same as the original elliptical polarization light without carrying the CPT-information will be blocked from the photodetector by a properly designed polarization analyzer.

Figure 14:
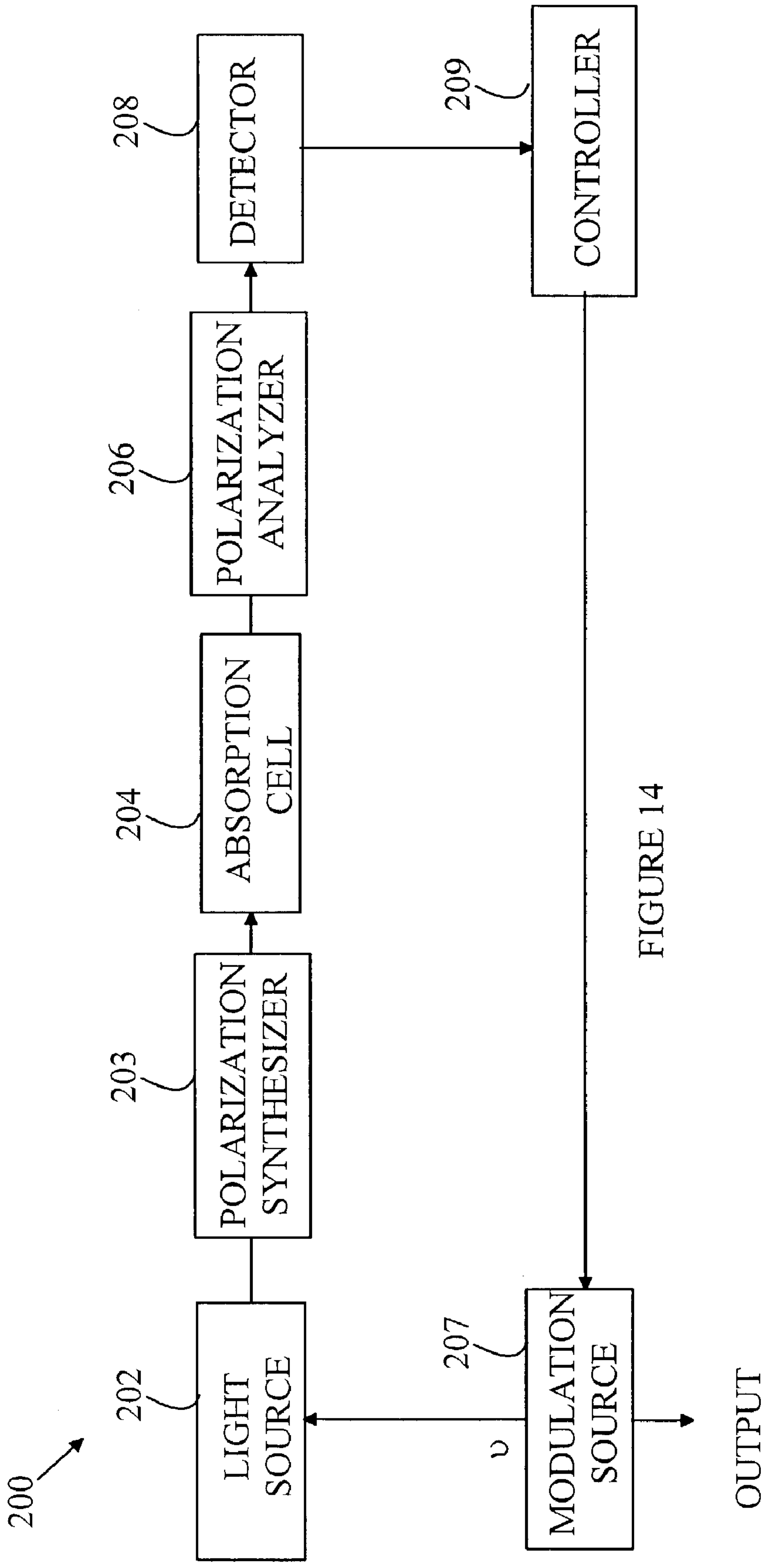
FIG. 14 is a block diagram of another embodiment of a reference signal generator according to the present invention.

Refer now to FIG. 14, which is a block diagram of a more general embodiment of a reference signal generator 200 according to the present invention. Light, from a light source 202 has CPT-generating frequency components as well as the AC-Stark-shift-manipulating frequency components. The polarization state of each frequency component can be converted to the desired polarization state by the polarization synthesizer 203 before the light is applied to the quantum absorber 204. Upon generating CPT in the quantum absorber, the polarization state, as well as the intensity, of each frequency component changes. The change depends on the quantum absorber and the spectrum of the light. Typically the CPT-generating frequency components change more than the AC-Stark shift manipulating frequency components. The light transmitted through quantum absorber 204 is then applied to a polarization analyzer 206, which blocks most of the power of the AC-Stark-shift-manipulating frequency components based on their polarization states as well as part of the power in the CPT-generating frequency components. The light leaving polarization analyzer 206 is then measured by a photodetector 208 which produces an output signal that is utilized to determine the resonance frequency in the quantum absorber. In the application of a reference signal generator, this signal from the photodetector 208 is used by controller 209 to control the frequency difference between the two CPT-generating frequency components so as to maximize the CPT in quantum absorber 204.

The above-described embodiments of the present invention have only discussed the adjustment of the modulation source frequency. However, in the preferred embodiment of the invention, the amplitude of the modulation signal is also adjusted to minimize the AC Stark shift in the CPT levels in the quantum absorber. At the correct modulation amplitude, the frequency at which the modulation source is locked is independent of the amplitude of the light signal from the laser. This amplitude can be determined experimentally when the reference signal generator is manufactured. Alternatively, a servo loop can adjust the modulation signal amplitude to minimize the errors resulting from the AC Stark shift. Since such servo systems are known in the art, they will not be discussed in detail here. The reader is referred to the U.S. patents discussed above for a more detailed explanation.

The quantum absorber discussed above can be any material that is in resonance with the applied electromagnetic field emitted by the electromagnetic source and that exhibits the CPT effect. For example, other alkali metals such as lithium, sodium, potassium, and cesium can also be utilized. In addition, suitable ions, molecules, or doped crystalline materials can be utilized.

The material utilized in the quantum absorber can be in the solid, liquid, or gaseous form. For example, the quantum absorber based on $^{87}$Rb discussed above preferably comprises rubidium in the vapor state.

The above-described embodiments of the present invention utilize a modulated laser as the source of electromagnetic radiation to induce CPT in the quantum absorber. However, other suitable electromagnetic radiation sources can be utilized.

The above embodiments of the present invention have been directed to frequency standards in which the goal is to produce a standard signal whose frequency is independent of environmental conditions. However, the present invention can also be utilized to construct a sensor that measures some physical quantity such as magnetic field strength. Consider a quantum absorber in which the CPT is based on two low energy states having an energy difference that depends on an external magnetic field that is applied to the absorber material. By measuring the modulation frequency at which the CPT is maximized, the strength of the magnetic field can be deduced.

Figure 15:
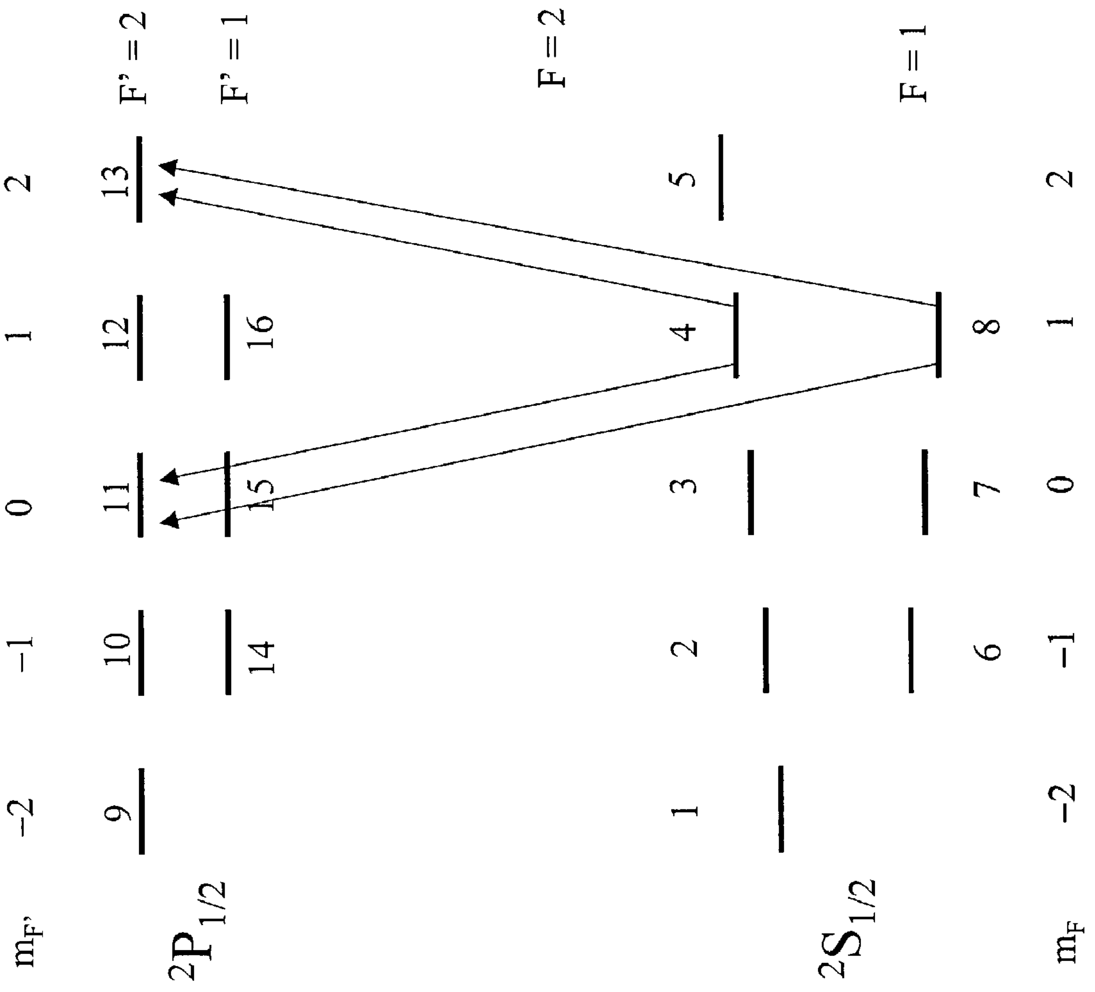
FIG. 15 illustrates some additional energy levels associated with an exemplary quantum absorber material, $^{87}$Rb.

For example, a magnetic field strength measuring apparatus can be constructed using transitions between other states of $^{87}$Rb. The energy levels in the ground states of $^{87}$Rb shift in response to an external magnetic field that is applied to the atom. State 3 and state 7 discussed above shift very little in the weak field, and hence, those states are well suited for constructing a frequency source. Refer now to FIG. 15, which depicts the ground state energy shifts of $^{87}$Rb atom in an external magnetic field. It should be noted that the shifts in energy levels are shown in an exaggerated manner. The excited state energy shifts are not shown explicitly in FIG. 15. In a weak magnetic field, the energy difference between state 2 and state 6 and the energy difference between state 4 and state 8 are proportional to the external magnetic field strength, but are opposite in sign. CPT between state 2 and state 6 (or between state 4 and state 8) can be induced by circularly polarized CPT-generating frequency components.

Refer again to FIG. 14. In this example, CPT between state 4 and state 8 in $^{87}$Rb is used to measure the magnetic field that is applied to the quantum absorber. The controller 209 uses the signal from the detector 208 to control the frequency difference between the two CPT-generating frequency components so as to maximize the CPT in quantum absorber 204. The frequency of the output signal, which is determined by the frequency difference between the two CPT-generating frequency components, is then measured in order to determine the strength of the magnetic field.

Alternatively, CPT between the three pairs of states (state 2 and state 6, state 3 and state 7, and state 4 and state 8 in FIG. 15) can be used to determine the magnetic field strength. In this case, controller 209 causes modulation source 207 to sweep the modulation frequency over a predetermined frequency range. The signal from detector 208 can be processed to determine the modulation frequency at which the CPT between state 2 and state 6, or between state 3 and state 7, or between state 4 and state 8 is maximized. Thus the strength of the magnetic field can be determined based on this information.

Similar sensors can be constructed to measure electric field strength or other environmental variables by choosing the suitable energy states in a suitable quantum absorber for CPT generation.

The above-described embodiments of the present invention utilize an electromagnetic radiation source in which the CPT-generating frequency components and the AC Stark shift manipulating frequency components have the same polarization. In addition, these embodiments assume that the polarization of the AC Stark shift manipulating frequency components does not change in passing through the quantum absorber. In the more general case, the polarization of the two CPT-generating frequency components may be different from each other as well as being different from the AC Stark shift manipulating frequency components. For example, the output of multiple lasers may be combined to provide the electromagnetic radiation signal having the CPT and AC Stark shift manipulating frequency components. One of the CPT-generating frequency components may come from one laser while the other CPT-generating frequency component may come from a different laser with different polarization. As noted above, the polarization of the AC Stark shift manipulating frequency components may be different from that of the CPT-generating frequency components. For example, the electromagnetic radiation source can include two lasers, one for generating the CPT-generating frequency components and one for generating the AC Stark shift manipulating frequency components. In addition, the polarization state of each AC Stark shift manipulating frequency component could be different from the other AC Stark shift manipulating frequency components. Finally, it should be noted that the AC Stark shift manipulating frequency components may undergo some change in polarization after passing through the quantum absorber.

The present invention depends only on the observation that the polarization of AC Stark shift manipulating frequency components will be distinguishable from the polarization of the CPT-generating frequency components after both sets of frequency components have passed through the quantum absorber. The polarization analyzer is set to preferentially attenuate the intensity of at least one of the AC Stark shift manipulating frequency components relative to the intensity of the CPT-generating frequency components. Ideally, all of the AC Stark shift manipulating frequency components would be suppressed; however, significant improvements in signal-to-noise ratio can be obtained if only a subset of AC Stark shift manipulating frequency components is so attenuated.

Consider the case in which the CPT-generating frequency components have different polarizations. The present invention does not need to detect both components. It is sufficient that one component is detected. Hence, as long as the polarization analyzer improves the ratio of the power in the CPT-generating frequency components to the AC Stark manipulating components, the present invention will provide an improvement over prior art systems.

Various modifications to the present invention will become apparent to those skilled in the art from the foregoing description and accompanying drawings. Accordingly, the present invention is to be limited solely by the scope of the following claims.

What is claimed is:

1. A CPT detector comprising:

a quantum absorber comprising a material having first and second low energy states coupled to a common high energy state, transitions between said first low energy state and said common high energy state or between said second low energy state and said common first polarization being altered to a second polarization upon said electromagnetic radiation passing through said quantum absorber;

a polarization analyzer for preferentially blocking electromagnetic radiation having a polarization state different from said second polarization state, said polarization analyzer being irradiated by an electromagnetic signal that has passed through said quantum absorber; and a detector for generating a signal related to the power of electromagnetic radiation that leaves said polarization analyzer.

2. The CPT detector of claim 1 further comprising an electromagnetic radiation source that generates electromagnetic radiation having CPT-generating frequency components for generating CPT, said CPT-generating frequency components differing in frequency by an amount equal to 2ν, and additional frequency components for altering an AC Stark shift in said quantum absorber, one of said CPT-generating frequency components having said first polarization state, said generated electromagnetic radiation irradiating said quantum absorber.

3. The CPT detector of claim 2 further comprising:

a controller for altering ν in response to said generated signal from said detector.

4. The CPT detector of claim 3 further comprising a circuit for generating an output signal having a frequency determined by ν.

5. The CPT detector of claim 2 wherein said electromagnetic radiation source comprises a laser for generating a first light signal having a third polarization state and a tunable oscillator for generating a signal that modulates said first light signal.

6. The CPT detector of claim 5 further comprising a waveplate for altering said third polarization to said first polarization.

7. The CPT detector of claim 5 wherein said polarization blocking analyzer comprises a waveplate and a polarizer for blocking light of a predetermined polarization.

8. The CPT detector of claim 1 wherein said electromagnetic radiation source comprises:

a first electromagnetic radiation generator that generates electromagnetic radiation at a frequency equal to $\nu_L$; and an oscillator for generating a modulation signal having a frequency ν, said modulating signal modulating said electromagnetic radiation from said first electromagnetic radiation source to generate a modulated electromagnetic radiation signal.

9. The CPT detector of claim 8 further comprising a polarization synthesizer for causing said modulated electromagnetic radiation signal to include one frequency component having said first polarization.

10. The CPT detector of claim 1 wherein said quantum absorber comprises hydrogen, or an alkali metal.

11. The CPT detector of claim 10 wherein said alkali metal is in a gaseous state.

12. The CPT detector of claim 10 where said alkali metal is an isotope selected from the group consisting of lithium, sodium, potassium, rubidium, and cesium.

13. A method for measuring CPT comprising:

providing a quantum absorber;

irradiating said quantum absorber with electromagnetic radiation having CPT-generating frequency components with frequency equal to $\nu_L \pm \nu$ and additional frequency components for reducing an AC Stark shift in said quantum absorber, said electromagnetic radiation in one of said CPT-generating frequency components having a first polarization, said first polarization of said CPT-generating frequency component being altered to a second polarization upon passing through said quantum absorber;

preferentially blocking electromagnetic radiation of a polarization different from said second polarization to create a filtered electromagnetic signal; and generating a signal related to the said filtered electromagnetic signal.

14. The method of claim 13 further comprising altering ν in response to said generated signal; and generating said output signal at a frequency determined by ν.

15. The method of claim 13 wherein said electromagnetic radiation comprises a first light signal having a third polarization state and a tunable oscillator for generating a signal that modulates said first light signal.

16. The method of claim 15 further comprising altering said third polarization state to said first polarization state.

17. The method of claim 13 wherein said quantum absorber comprises hydrogen or an alkali metal vapor.

18. The method of claim 17 where said alkali metal is an isotope selected from the group consisting of lithium, sodium, potassium, rubidium, and cesium.

* * * * *

UNITED STATES PATENT AND TRADEMARK OFFICE

CERTIFICATE OF CORRECTION

PATENT NO. : 6,993,058 B2

APPLICATION NO. : 10/425138

DATED : January 31, 2006

INVENTOR(S) : Zhu

It is certified that error appears in the above-identified patent and that said Letters Patent is hereby corrected as shown below:

On the Title page, in Item [56], under “Other Publications”, in column 2, line 2, delete “p.” and insert - - pp. - -, therefor.

On the Title page, in Item [56], under “Other Publications”, in column 2, line 5, delete “Opticas” and insert - - Optics - -, therefor.

On the Title page, in Item [56], under “Other Publications”, in column 2, line 12, delete “Applicatin” and insert - - Application - -, therefor.

In column 11, line 20, in Claim 4, after “comprising” insert - - : - -.

In column 12, line 28, in Claim 14, after “comprising” insert - - : - -.

In column 12, line 41, in Claim 18, delete “where” and insert - - wherein - -, therefor.

Signed and Sealed this

Twenty-second Day of August, 2006

JON W. DUDAS

*Director of the United States Patent and Trademark Office*